United States Patent
Dhillon et al.

(10) Patent No.: US 11,928,961 B2
(45) Date of Patent: Mar. 12, 2024

(54) PHANTOM TRAFFIC JAM DETECTION AND AVOIDANCE

(71) Applicant: GOOGLE LLC, Mountain View, CA (US)

(72) Inventors: Neil Dhillon, Mountain View, CA (US); Tanmay Wadhwa, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 51 days.

(21) Appl. No.: 16/609,064

(22) PCT Filed: Jun. 24, 2019

(86) PCT No.: PCT/US2019/038664
§ 371 (c)(1),
(2) Date: Oct. 28, 2019

(87) PCT Pub. No.: WO2020/263214
PCT Pub. Date: Dec. 30, 2020

(65) Prior Publication Data
US 2022/0108610 A1      Apr. 7, 2022

(51) Int. Cl.
*G08G 1/08* (2006.01)
*B60K 31/18* (2006.01)
(Continued)

(52) U.S. Cl.
CPC ....... *G08G 1/096725* (2013.01); *B60K 31/18* (2013.01); *B60K 35/00* (2013.01);
(Continued)

(58) Field of Classification Search
CPC ........... G08G 1/096725; G08G 1/0112; G08G 1/0116; G08G 1/0133; G08G 1/0145;
(Continued)

(56) References Cited

U.S. PATENT DOCUMENTS

| 6,615,130 B2 | 9/2003 | Myr |
| 7,925,426 B2 | 4/2011 | Koebler et al. |

(Continued)

FOREIGN PATENT DOCUMENTS

| CA | 2923924 C | 1/2018 |
| DE | 10037827 B4 | 1/2008 |

(Continued)

OTHER PUBLICATIONS

Jordan Khan, Waze app will now alert you when driving over the speed limit, Mar. 29, 2016, https://9to5mac.com/2016/03/29/waze-speed-limit-warnings/ (Year: 2016).*

(Continued)

*Primary Examiner* — Adam D Tissot
*Assistant Examiner* — Laura E Linhardt
(74) *Attorney, Agent, or Firm* — MARSHALL, GERSTEIN & BORUN LLP (57) ABSTRACT

To reduce the effects of traffic jams, a traffic reduction system identifies road segments having more a threshold amount of traffic. The traffic reduction system also receives an indication of a current location of a client device operating in a vehicle and compares the current location to the locations of the identified road segments to determine whether the vehicle is on or approaching the road segment. If the vehicle is on or approaching the road segment, the traffic reduction system determines a target speed for the vehicle to maintain an equal distance between the vehicle and the vehicle in front of the vehicle and the vehicle and the vehicle behind the vehicle. The traffic reduction system then provides the target speed to the client device for display on (Continued)

a user interface. By maintaining equal distances between vehicles in front of and behind each other, the amount of traffic dissipates.

18 Claims, 6 Drawing Sheets

(51) Int. Cl.
| | | |
|---|---|---|
| *B60K 35/00* | (2006.01) | |
| *B60W 30/18* | (2012.01) | |
| *G05D 1/00* | (2006.01) | |
| *G05D 1/02* | (2020.01) | |
| *G06V 20/54* | (2022.01) | |
| *G08G 1/01* | (2006.01) | |
| *G08G 1/017* | (2006.01) | |
| *G08G 1/052* | (2006.01) | |
| *G08G 1/056* | (2006.01) | |
| *G08G 1/0967* | (2006.01) | |

(52) U.S. Cl.
CPC ........... *G06V 20/54* (2022.01); *G08G 1/0112* (2013.01); *G08G 1/0116* (2013.01); *G08G 1/0133* (2013.01); *G08G 1/0145* (2013.01); *G08G 1/017* (2013.01); *G08G 1/052* (2013.01); *G08G 1/056* (2013.01); *B60K 2310/22* (2013.01); *B60K 2370/167* (2019.05); *B60K 2370/188* (2019.05); *G06V 2201/08* (2022.01)

(58) Field of Classification Search
CPC ........ G08G 1/017; G08G 1/052; G08G 1/056; B60K 31/18; B60K 35/00; B60K 2310/22; B60K 2370/167; B60K 2370/188; G06V 20/54; G06V 2201/08; B60W 2554/406; B60W 40/04; B60W 2554/408; B60W 30/18018; B60L 2240/68; B60Y 2300/244; B60Y 2300/0954; G06T 2207/30241

See application file for complete search history.

(56) References Cited

U.S. PATENT DOCUMENTS

| | | | |
|---|---|---|---|
| 8,676,466 | B2 | 3/2014 | Mudalige |
| 9,008,960 | B2 | 4/2015 | Horvitz |
| 9,081,651 | B2 | 7/2015 | Filev et al. |
| 9,272,711 | B1 * | 3/2016 | Sivaraman ............. G08G 1/163 |
| 10,059,335 | B2 | 8/2018 | Newman et al. |
| 10,241,482 | B2 * | 3/2019 | Fadell ...................... F24F 11/46 |
| 10,403,133 | B1 * | 9/2019 | Christensen ....... G01C 21/3492 |
| 11,232,705 | B2 * | 1/2022 | Yang ................ G08G 1/096708 |
| 2007/0142987 | A1 | 6/2007 | Takamatsu et al. |
| 2008/0071465 | A1 * | 3/2008 | Chapman ............. G08G 1/0104 |
| | | | 701/117 |
| 2012/0059574 | A1 | 3/2012 | Hada |
| 2018/0301026 | A1 * | 10/2018 | Yudanov .............. G08G 1/0141 |
| 2018/0345965 | A1 | 12/2018 | Payne et al. |
| 2020/0168084 | A1 * | 5/2020 | Yang .................... G08G 1/0125 |
| 2021/0049907 | A1 * | 2/2021 | Dhillon ................... H04W 4/44 |
| 2021/0158693 | A1 * | 5/2021 | Sze ................... G08G 1/09623 |

FOREIGN PATENT DOCUMENTS

| | | | |
|---|---|---|---|
| JP | H10-074296 | A | 3/1998 |
| JP | 2003-272089 | A | 9/2003 |
| JP | 2005112255 | A * | 4/2005 |
| JP | 2006-300771 | A | 11/2006 |
| JP | 2013-537331 | A | 9/2013 |
| JP | 2018-190315 | A | 11/2018 |

OTHER PUBLICATIONS

William J. Beaty, Traffic Waves, 2016, http://trafficwaves.org/ (Year: 2016).*

International Search Report and Written Opinion for Application No. PCT/US2019/038664, dated Mar. 5, 2020.

Office Action, Japanese patent application No. 2021-555833 dated Jun. 5, 2023.

* cited by examiner

PHANTOM TRAFFIC JAM DETECTION AND AVOIDANCE

FIELD OF THE DISCLOSURE

The present disclosure relates to digital mapping data and, more particularly, to detecting and reducing the effects of traffic jams by providing instructions to users and vehicles entering a road segment to mitigate traffic on the road segment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request map and navigation data for various geographic locations. Software applications typically generate navigation data in response to receiving input from a user, specifying the starting point and the destination. Furthermore, many users, particularly in densely populated areas, experience heavy traffic on a daily basis. During these periods, vehicles speed up for a brief moment before coming to a stop and then repeat this process several times before reaching their respective destinations. While large highways and expressways can reduce traffic since they do not have intersections, heavy traffic also occurs on highways and expressways for different reasons, such as accidents, lane closures, construction, etc.

In some scenarios, traffic jams may occur without an accident or lane closure. Oftentimes, drivers sit in traffic for lengthy periods expecting to approach an accident, lane closure, construction area, etc., before being able to speed up and continue on to their destinations without any more delays. However, these drivers are unable to determine the cause of the traffic jam and instead at some point traffic lightens and they begin speeding up without any apparent reason. One cause of such traffic jams is a phenomenon known as the "phantom traffic jam", in which vehicles slow down or stop without an apparent cause. These "phantom traffic jams" are due to a chain reaction caused by one vehicle slowing down on a densely populated roadway. This causes the vehicle behind it to slow down even more and sets off a chain reaction of cars slowing down which acts like a traveling wave. By the time each vehicle on the roadway reduces speed and waits for the vehicle in front to speed up, this process may repeat itself. In this manner, one vehicle that slows down too rapidly on a densely populated roadway can create a half hour, an hour, or even hours of traffic. In 2009, scientists at the University of Alberta and Massachusetts Institute of Technology proposed an equation describing this phenomenon, which explains how a temporary disturbance (such as a sudden influx of traffic or vehicles changing lanes) can cause a chain reaction of sudden braking that may that trickle down a road for hours (M. R. Flynn, A. R. Kasimov, J.-C. Nave, R. R. Rosales, and B. Seibold, "*Self-sustained nonlinear waves in traffic flow*", Physical Review E, 2009; 79 (5).)

SUMMARY

To reduce the effects of traffic jams, a traffic reduction system first identifies a traffic jam on a road segment which may be a phantom traffic jam. The traffic reduction system may identify the traffic jam on the road segment by receiving sensor data from vehicles on the road segment or infrastructure components on the road segment indicating that several vehicles are slowing down. Furthermore, the traffic reduction system may receive sensor data from infrastructure components on the road segment, such as image or video data that does not include an accident, construction, traffic signal, or lane closure on the road segment. The traffic reduction system may also receive additional information regarding the cause of the traffic from a traffic sever.

In any event, when the traffic reduction system identifies a traffic jam, the traffic reduction system determines a target speed or speed range for vehicles approaching the road segment to travel at to reduce the amount of traffic on the road segment. More specifically, if each vehicle on the road segment maintains the same distance between the vehicle and the vehicle in front of the vehicle and the vehicle and the vehicle behind the vehicle, then the vehicles will not have to slow down. Accordingly, the traffic reduction system determines a following distance for each of the vehicles to maintain between the vehicle in front of and behind each respective vehicle and calculates a target speed corresponding to the following distance.

The traffic reduction system provides an indication of the target speed to each vehicle, or a computing device within the vehicle, approaching the road segment. In some implementations, the indication is a numeric indication which is provided for display on a user's client device or on the vehicle head unit. The indication may also include a background color, such as a green background color indicating that the user needs to speed up to maintain the appropriate following distance, a yellow background color indicating that the user needs to slow down, a blue background color indicating that the user needs to stay at the same speed, an orange background color that the user needs to slow down rapidly, etc. In this manner, the user/driver may travel at the target speed to reduce traffic on the road segment. In other implementations, the indication of the target speed is provided to a computing device within the vehicle that controls some operation of the vehicle, such as a computing device in an autonomous vehicle, a semi-autonomous vehicle, or any other vehicle having autonomous operation features. In this manner, the computing device may control the vehicle to adjust the speed and travel at the target speed.

In particular, an example embodiment of the techniques of the present disclosure is a method for use in controlling the speed of a vehicle. The method includes identifying a road segment within a geographic area having more than a threshold amount of traffic, determining a target speed for a vehicle approaching the road segment to travel at to reduce an amount of traffic at the road segment, and providing, to a computing device associated with a vehicle approaching the road segment, an indication of the target speed for the vehicle.

Another embodiment of these techniques is a server device for use in controlling the speed of a vehicle. The server device includes one or more processors and a non-transitory computer-readable medium storing instructions. When executed by the one or more processors, the instructions cause the server device to identify a road segment within a geographic area having more than a threshold amount of traffic, determine a target speed for a vehicle approaching the road segment to travel at to reduce an amount of traffic at the road segment, and provide, to a computing device associated with a vehicle approaching the road segment, an indication of the target speed for the vehicle.

Yet another embodiment of these techniques is a method for use in controlling the speed of a vehicle. The method includes providing, to a server device, an indication of a location of the vehicle, receiving, from the server device, an indication of a target speed for the vehicle to travel at when the vehicle is approaching a road segment having more than a threshold amount of traffic, determining a current speed of the vehicle, and outputting a feedback signal indicative of a difference between the current speed and a target speed.

A further embodiment of these techniques includes a device for use in controlling the speed of a vehicle. The device includes one or more processors and a non-transitory computer-readable medium storing instructions. When executed by the one or more processors, the instructions cause the device to: provide, to a server device, an indication of a location of the vehicle; receive from the server device, an indication of a target speed for the vehicle to travel at when the vehicle is approaching a road segment having more than a threshold amount of traffic; determine a current speed of the vehicle; and output a feedback signal indicative of a difference between the current speed and the target speed.

The present disclosure also provides a computer-readable medium comprising instructions that, when executed by a computing device, cause the computing device to perform any of the methods disclosed herein. The present disclosure also provides a computer program comprising instructions that, when executed by a computing device, cause the computing device to perform any of the methods disclosed herein.

DETAILED DESCRIPTION

Overview

The present disclosure provides methods for use in controlling the speed of a vehicle to reduce the effects of traffic jams. In accordance with some embodiments, a respective target speed for each of a plurality of vehicles approaching a traffic jam is determined, and an indication of the target speed is provided to each vehicle. Upon receiving the indication of the target speed, each vehicle adjusts its current speed to minimize the difference between its current speed and the target speed. Driving at the target speed causes the distance between each vehicle to increase and/or optimizes the speed at which vehicles approach the traffic jam, which may be a phantom traffic jam. This, in turn, reduces the likelihood of sudden braking that might perpetuate the phantom traffic jam. By controlling the speed of vehicles in this manner, the phantom traffic jam is able to dissipate.

As described above, phantom traffic jams may occur due to a chain reaction caused by one vehicle slowing down on a densely populated roadway. This causes the vehicle behind it to slow down even more and sets off a chain reaction of vehicles slowing down which acts like a traveling wave. The minimum traffic density or number of vehicles per unit of distance in which a traffic jam can occur on a road may be determined using the following equation:

$$\rho_L = \frac{\rho_M}{2}\left(1 - \sqrt{1 - \frac{4\beta}{u^2}}\right)$$

where:

$\rho_L$ is the minimum traffic density or number of vehicles per unit of distance in which a traffic jam can occur on a road, $\rho_M$ is the maximum traffic density for the particular road (e.g., where there is no space between vehicles on the road), $\beta$ is a measure of road conditions which decreases in accordance with the curvature of the road and/or the weather conditions, and u is the speed at which vehicles travel on the road when there is no traffic, such as the speed limit or slightly above the speed limit.

In this manner, as the average speed for vehicles traveling on the road without traffic increases, the minimum traffic density in which a traffic jam can occur decreases. Accordingly, phantom traffic jams may be likely to occur on roadways with higher speed limits such as highways, tollways, and expressways.

Figure 1A:
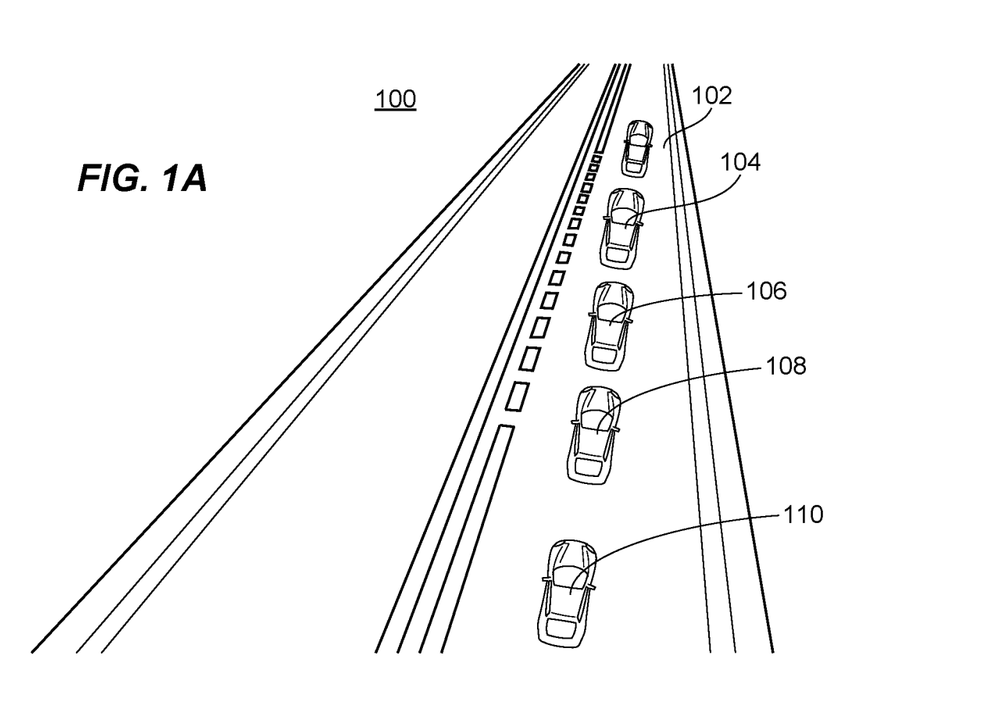
FIG. 1A illustrates an example scenario including vehicles on a roadway that create traffic by following too closely together.

This phenomenon is illustrated in FIG. 1A which depicts an example roadway 100 with vehicles 102-110 traveling on the roadway. The roadway 100 does not include an intersection, traffic signal, accident, construction, lane closure, etc. However, a traffic jam is created along the roadway due to a second vehicle 104 following a first vehicle 102 too closely. When the first vehicle 102 slows down, the second vehicle 104 decelerates faster than the first vehicle 102 to avoid hitting the first vehicle 102. The third vehicle 106 decelerates faster than the second vehicle 104 and the fourth vehicle 108 decelerates even faster than the third vehicle 106. The fourth vehicle 108 then has to wait for the second vehicle 104 and the third vehicle 106 to speed up before the fourth vehicle 108 can accelerate once again. Accordingly, the traffic flow behaves as a traveling wave amplifying in magnitude the further a vehicle is from the first vehicle that slows down. As the fifth vehicle 110 approaches the roadway 100, the fifth vehicle 110 is also likely to follow the pattern of the first four vehicles. The fifth vehicle 110 may follow closely behind the fourth vehicle 108 and accelerate and decelerate in the same manner as the fourth vehicle 108.

Figure 1B:
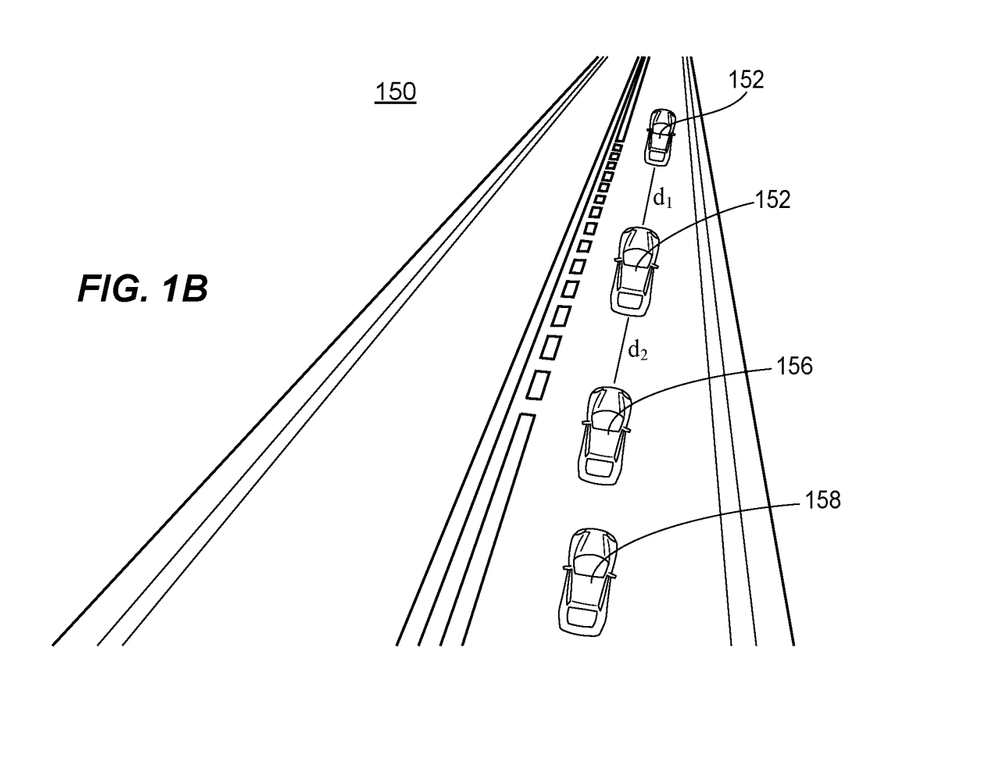
FIG. 1B illustrates another example scenario including vehicles on a roadway that do not create traffic by maintaining the appropriate following distances.

On the other hand, when each vehicle maintains an equal distance between the vehicle and the vehicle in front of the vehicle and the vehicle and the vehicle behind the vehicle, these phantom traffic jams do not occur. This is illustrated in FIG. 1B which depicts an example roadway 150 with vehicles 152-158 traveling on the road. The second vehicle 154 on the roadway 150 maintains the same distance between the second vehicle 154 and first vehicle 152 ($d_1$) as the distance between the second vehicle 154 and the third vehicle 156 ($d_2$). As a fourth vehicle 158 approaches the third vehicle 156, the third vehicle 156 and the fourth vehicle 158 maintain the same distance as the distance between the third vehicle 156 and the second vehicle 154 ($d_2$).

Accordingly, to maintain an equal distance between the vehicle and the vehicle in front of the vehicle and the vehicle and the vehicle behind the vehicle (also referred to herein as "bilateral control"), the traffic reduction system determines a target acceleration of a vehicle on the road segment or approaching the road segment at a particular point in time based on the speeds and positions of the vehicle, the vehicle in front of the vehicle, and the vehicle behind the vehicle. More specifically, the traffic reduction system may determine the target acceleration (a) of the vehicle as:

$$a = k_d(x_{n+1} - 2x_n + x_{n-1}) + k_v(v_{n+1} - 2v_n + v_{n-1})$$

where:
$x_n$ is the position of vehicle n,
$x_{n+1}$ is the position of vehicle n+1 in front of vehicle n,
$x_{n-1}$ is the position of vehicle n−1 behind vehicle n,
$v_n$ is the velocity of vehicle n,
$v_{n+1}$ is the velocity of vehicle n+1 in front of vehicle n,
$v_{n-1}$ is the velocity of vehicle n−1 behind vehicle n,
$k_d$ is the gain of positional feedback, and
$k_v$ is the gain of velocity feedback.

The traffic reduction system may then determine a target speed for the vehicle to accelerate or decelerate to within a threshold time period (e.g., 10 seconds, 30 seconds, etc.) based on the vehicle's current speed, the target acceleration, and the threshold time period. The target speed may be presented on a user's client device 10 numerically or as a background color indicating that the user needs to speed up, slow down, or maintain a constant speed.

Example Hardware and Software Components

Figure 2:
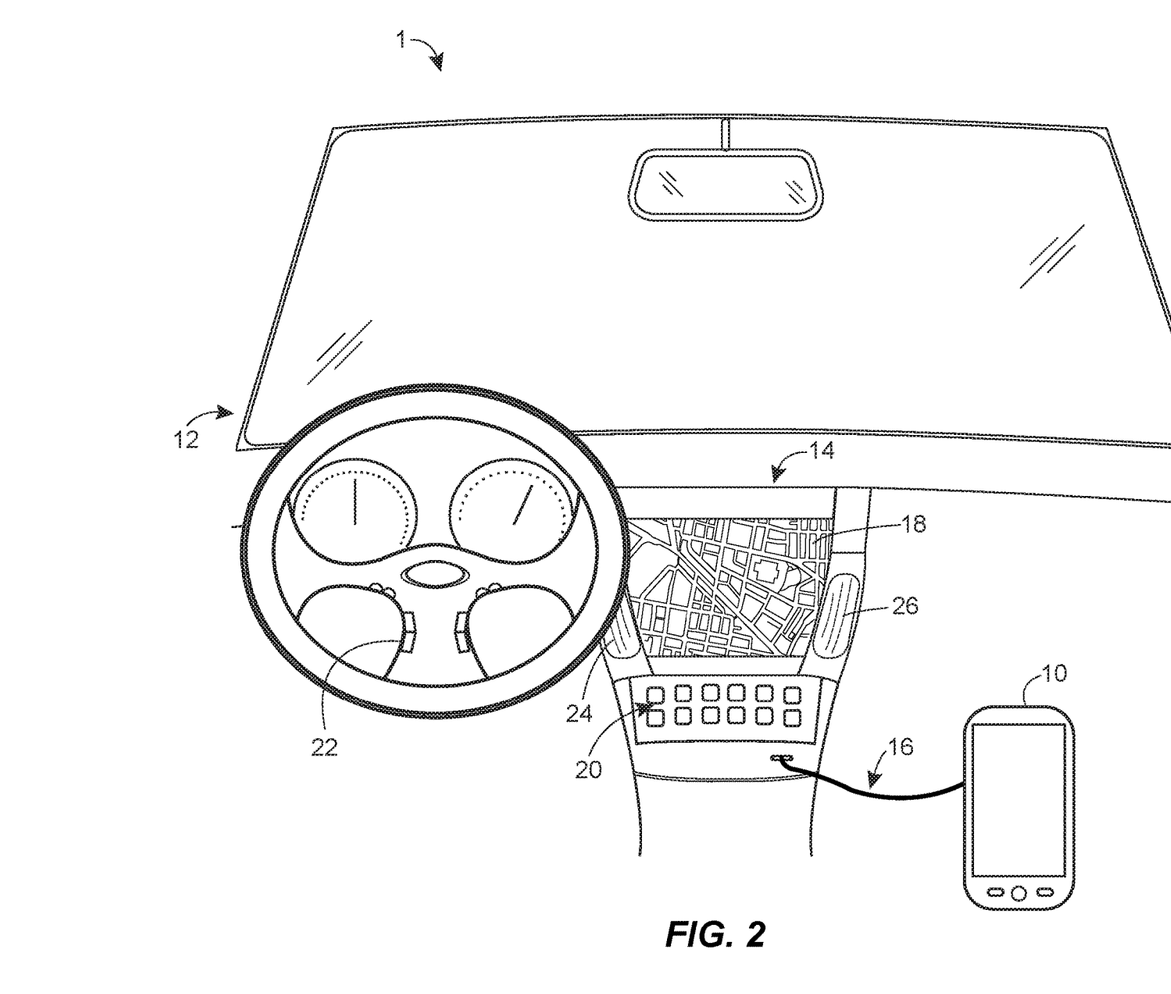
FIG. 2 illustrates an example vehicle in which the techniques of the present disclosure can be used to generate speed displays for reducing traffic jams.

Referring to FIG. 2, an example environment 1 in which the techniques outlined above can be implemented includes a client device 10 and a vehicle 12 with a head unit 14. The client device 10 may be a smart phone or a tablet computer, for example. The client device 10 communicates with the head unit 14 of the vehicle 12 via a communication link 16, which may be wired (e.g., Universal Serial Bus (USB)) or wireless (e.g., Bluetooth, Wi-Fi Direct). The client device 10 also can communicate with various content providers, servers, etc. via a wireless communication network such as a fourth- or third-generation cellular network (4G or 3G, respectively).

The head unit 14 can include a display 18 such as a digital map. The display 18 in some implementations is a touchscreen and includes a software keyboard for entering text input, which may include the name or address of a destination, point of origin, etc. Hardware input controls 20 and 22 on the head unit 14 and the steering wheel, respectively, can be used for entering alphanumeric characters or to perform other functions for requesting navigation directions. The head unit 14 also can include audio input and output components such as a microphone 24 and speakers 26, for example.

Figure 3:
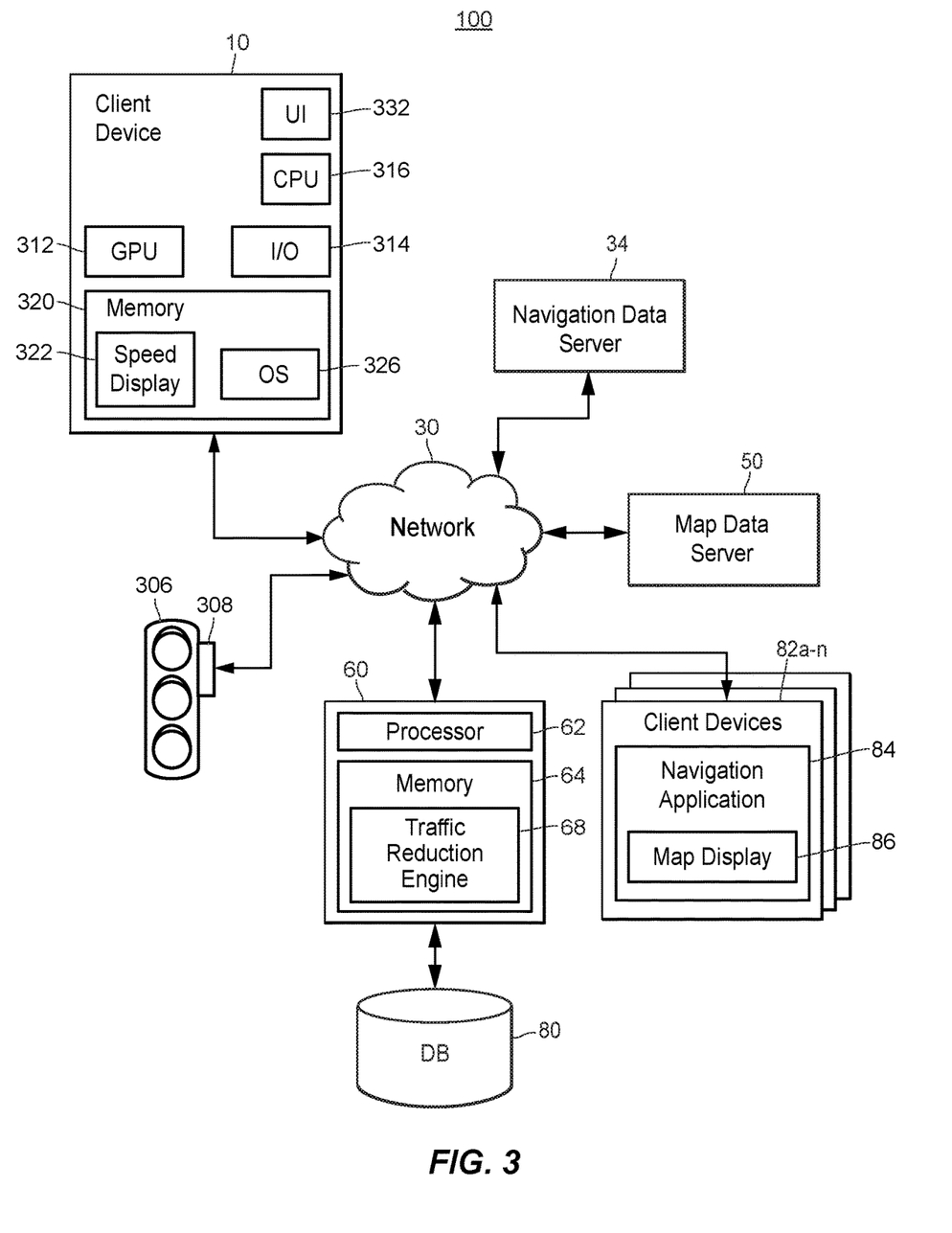
FIG. 3 is a block diagram of an example communication system in which techniques for reducing the effects of traffic jams can be implemented.

Referring to FIG. 3, an example communication system 100 in which a traffic reduction system can be implemented includes a client device 10 and several other client devices 82a-n, such as a computing device configured to execute a geographic application 84, which also can be referred to as "navigation application 84." Depending on the implementation, the application 84 can display an interactive digital map, request and receive routing data to provide driving, walking, or other navigation directions, provide various geolocated content, etc. Each of the client devices 82a-n may be operated by users displaying digital maps while navigating to various locations.

Furthermore, the example communication system 100 includes infrastructure components 306, such as traffic lights which are disposed on or around road segments and collect sensor data related to the road segments. The infrastructure components 306 may include traffic signals, cameras, street lights, or any other suitable roadside equipment. Furthermore, the infrastructure components 306 may include one or more sensors (not shown) such as a camera, a positioning sensor, etc., a processing component 308, and a vehicle-to-infrastructure (V2I) communication interface for communicating with vehicles within a communication range of the infrastructure component 306 and/or communicating with server devices.

In addition to the client device 10, the other client devices 82a-n, and the infrastructure components 306, the communication system 100 includes a server device 60 configured to provide a target speed to the client device 10. The server device 60 can be communicatively coupled to a database 80 that stores, in an example implementation, sensor data received from the other client devices 82a-n and the infrastructure components 306 to determine whether there is a traffic jam at a particular road segment.

More generally, the server device 60 can communicate with one or several databases that store any type of suitable geospatial information or information that can be linked to a geographic context. The communication system 100 also can include a navigation data server 34 that provides driving, walking, biking, or public transit directions, for example. Further, the communication system 100 can include a map data server 50 that provides map data to the server device 60 for generating a map display. Still further, the communication system 100 can include a traffic server (not shown) that provides traffic data to the server device 60. The devices operating in the communication system 100 can be interconnected via a communication network 30.

The client device 10 may include a memory 320, one or more processors (CPUs) 316, a graphics processing unit (GPU) 312, an I/O module 314, a user interface (UI) 332, and one or several sensors (not shown), such as a global positioning system (GPS) module, an accelerometer, a gyroscope, a magnetometer such as a compass, etc. The memory 320 can be a non-transitory memory and can include one or several suitable memory modules, such as random access memory (RAM), read-only memory (ROM), flash memory, other types of persistent memory, etc. The I/O module 314 may be a touch screen, for example. In various implementations, the client device 10 can include fewer components than illustrated in FIG. 3 or conversely, additional components. While the client device 10 is described above with reference to FIG. 1 as a smart phone or a tablet computer, the client device 10 may be any suitable portable or non-portable computing device. For example, the client device 10 may be a laptop computer, a desktop computer, a wearable device such as a smart watch or smart glasses, etc.

The memory 320 stores an operating system (OS) 326, which can be any type of suitable mobile or general-purpose operating system. The OS 326 can include application programming interface (API) functions that allow applications to retrieve sensor readings. For example, a software application configured to execute on the client device 10 can include instructions that invoke an OS 326 API for retrieving a current location of the client device 10 at that instant. The API can also return a quantitative indication of how certain the API is of the estimate (e.g., as a percentage).

The memory 320 also stores a speed display 322, which can be included as functionality within a geographic application, such as a navigation application. The navigation application can display an interactive digital map, request and receive routing data to provide driving, walking, or other navigation directions, provide various geolocated content, etc. In some implementations, the current location of the client device 10 is provided to the server device 60. If the server device 60 determines that the client device 10 is approaching a road segment with traffic (e.g., within a threshold distance of the road segment, such as 500 ft, half of a mile, one mile, etc., and/or when the vehicle 12 is travelling toward the road segment according to the direction of travel of the vehicle 12), particularly traffic that is not caused by an accident, lane closure, construction, traffic signal, etc., but by vehicles following each other too closely, the server device 60 provides an indication of a target speed for the vehicle 12 associated with the client device 10 to travel at to reduce the amount of traffic on the road segment. The speed display 322 is configured to present the indication of the target speed, for example as a numeric indication (e.g., 33 mph), as a directional arrow (e.g., where an arrow pointing up indicates that the user should speed up and an arrow pointing down indicates that the user should slow down), and/or as a background color selected from a set of background colors that each represent different changes in speed. For example, a green background color may indicate that the user of the client device 10 needs to speed up, a blue background color may indicate that the user of the client device 10 needs to stay at the same speed, a yellow background color may indicate that the user of the client device 10 needs to slow down, and an orange background color may indicate that the user of the client device 10 needs to rapidly decelerate.

The speed display 322 may be presented as a notification within the navigation application, and may be presented periodically overlaying the interactive digital map or continuously for the time period in which the client device 10 is approaching or is on the road segment with traffic. The server device 60 may provide real-time updates of the target speed for the vehicle 12 to travel at based on the speeds of the other vehicles in front of the vehicle 12, behind the vehicle 12, and/or on the road segment.

As mentioned above, each client device 82a-n may be operated by a user displaying map data. Each of the client devices 82a-n may be a smartphone or a tablet computer and may have one or several sensors. Additionally, each client device 82a-n may include a memory that stores an operating system (OS) and a navigation application 84 which is configured to generate interactive digital maps and/or perform other geographic functions, as indicated above. The navigation application 84 can receive map data in a raster (e.g., bitmap) or non-raster (e.g., vector graphics) format from the map data server 50 and present the map data via a map display 86. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The navigation application 84 also can display driving, walking, or transit directions, and in general provide functions related to geography, geolocation, navigation, etc. via the map display 86.

The client devices 82a-n may provide map data and/or sensor data to the server device 60 for identifying traffic on various road segments. More specifically, when a user of the client device 82a-n agrees to share location and other sensor data, the client device 82a-n provides positioning data indicating the current location of the client device 82a-n to the server device 60 as well as acceleration data and/or speed data for the client device 82a-n. When the server device 60 obtains several instances of deceleration from client devices 82a-n within the same geographic area, or speeds below a threshold speed, the server device 60 may identify traffic on the roadway corresponding to the current locations of the client devices 82a-n. In other implementations, the server device 60 may communicate with a traffic server (not shown) to identify traffic on a road segment.

It is noted that although FIG. 3 illustrates the navigation application 84 as a standalone application, the functionality of the navigation application 84 also can be provided in the form of an online service accessible via a web browser executing on the client devices 82a-n, as a plug-in or extension for another software application executing on the client devices 82a-n, etc. The navigation application 84 generally can be provided in different versions for different respective operating systems. For example, the maker of the client devices 82a-n can provide a Software Development Kit (SDK) including the navigation application 84 for the Android™ platform, another SDK for the iOS™ platform, etc.

In some implementations, the server device 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a traffic reduction engine 68, which can identify traffic jams on roadways or portions of roadways, such as road segments. The traffic reduction engine 68 may also receive a current location of a client device 10 approaching the roadway and determine a target speed for the vehicle 12 associated with the client device 10 to travel at to reduce the amount of traffic on the roadway. An indication of the target speed is displayed by the speed display 322 of the client device 10.

The traffic reduction engine 68 and the speed display 322 can operate as components of a traffic reduction system. Alternatively, the traffic reduction system can include only server-side components and simply provide the speed display 322 with instructions to display an indication of the target speed. In other words, traffic reduction techniques in these embodiments can be implemented transparently to the speed display 322. As another alternative, the entire functionality of the traffic reduction engine 68 can be implemented in the speed display 322. While the speed display 322 is shown in FIG. 3 as operating in the client device 10, the speed display 322 may also operate within a vehicle head unit 14 or in any other computing device operating in a vehicle 12. For example, the speed display 322 may operate in a computing device that controls operation of the vehicle 12. In this manner, the server device 60 may provide indications of target speeds for the vehicle 12 to travel at to the speed display 322, and the computing device may control operation of the vehicle 12 to accelerate or decelerate to achieve the desired speeds.

For simplicity, FIG. 3 illustrates the server device 60 as only one instance of a server. However, the server device 60 according to some implementations includes a group of one or more server devices, each equipped with one or more processors and capable of operating independently of the other server devices. Server devices operating in such a group can process requests from the client device 10 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the speed display 322 operating in the client device 10 receives and transmits data to the server device 60. Thus, in one example, the client device 10 may transmit a communication to the traffic reduction engine 68 (implemented in the server device 60) indicating the current location of the client device 10. Accordingly, the traffic reduction engine 68 may determine whether the vehicle 12 is approaching a road segment having more than a threshold amount of traffic based on the current location of the client device. The threshold amount of traffic may be a traffic density for the road segment, such as 100 vehicles per mile, 200 vehicles per mile, etc. In other implementations, the threshold amount of traffic may be based on a threshold speed for vehicles on the road segment relative to the speed limit for the road segment. In yet other implementations, the threshold amount of traffic may be based on a threshold deceleration for vehicles on the road segment. For example, the traffic reduction engine 68 may receive sensor data from client devices 82a-n traveling on the road segment indicating speed and acceleration/deceleration values for the vehicles. The traffic reduction engine 68 may also receive sensor data from infrastructure components 306 on the road segment. In other implementations, the traffic reduction engine 68 may receive traffic data from a traffic server indicating the amount of traffic on a road segment. The traffic server may provide a traffic density for the road segment, a categorical description of the amount of traffic, such as light, medium, or heavy, or an indication of an expected amount of additional time for traversing the road segment due to the traffic. Accordingly, in this example, the threshold amount of traffic may be a threshold traffic density (e.g., 100 vehicles per mile), a threshold traffic category (e.g., medium or above), or a threshold amount of additional time for traversing the road segment due to the traffic (e.g., 5 minutes).

The traffic reduction engine 68 may compare average speed and/or acceleration/deceleration values to a threshold speed or deceleration to determine whether the road segment has a threshold amount of traffic. The threshold speed may be based on the speed limit for the road segment, such that the threshold speed for a road segment having a speed limit of 55 mph, for example, is higher than the threshold speed for a road segment having a speed limit of 35 mph. In some implementations, the sensor data from the infrastructure components 306 may include image or video data from a camera on the road segment. The traffic reduction engine 68 may analyze the image or video data to determine that there are no accidents, lane closures, traffic signals, construction, etc., on the road segment. This may indicate that the traffic is due to vehicles failing to maintain threshold following distances on the road segment. The traffic reduction engine 68 may also receive additional information regarding the cause of the traffic from a traffic sever.

Still further, the traffic reduction engine 68 may receive a signal from a vehicle located within the road segment indicating that the traffic is not caused by an accident, a lane closure, construction, or a traffic signal. For example, the traffic reduction engine 68 may receive information from a navigation application 84 operating in a client device 82a-n within the vehicle indicating that the traffic is not caused by an accident, a lane closure, construction, or a traffic signal, where the information is self-reported by a user. In another example, the client device 82a-n may communicate with infrastructure components 306 on the road segment which indicate that the traffic is not caused by an accident, a lane closure, construction, or a traffic signal, and may forward the communication to the server device 60.

In any event, the traffic reduction engine 68 then determines a target speed for the vehicle 12 when the vehicle 12 is approaching a road segment with more than the threshold amount of traffic. The target speed may be determined based on the traffic density of the road segment and/or a threshold following distance for the road segment. For example, the traffic reduction engine 68 may determine a threshold following distance for the road segment based on the traffic density of the road segment where the threshold following distance decreases as the traffic density increases. Furthermore, the threshold following distance may be based on the flow of traffic on the road segment, such that following distances may be higher as vehicles travel faster on the road segment. For example, the following distance may be higher when vehicles travel around 50 mph on the road segment than when vehicles travel around 30 mph on the road segment. The traffic reduction engine 68 may then determine a target speed based on the following distance and the speed of the vehicles on the road segment.

In some implementations, the traffic reduction engine 68 determines a target speed for the vehicle 12 using bilateral control methods, where the target speed is determined to maintain a threshold distance between the vehicle 12 and the vehicles in front of and behind the vehicle 12. The traffic reduction engine 68 determines a target acceleration for the vehicle 12 using the equation described above, where:

$$a = k_d(x_{n+1} - 2x_n + x_{n-1}) + k_v(v_{n+1} - 2v_n + v_{n-1})$$

The traffic reduction engine 68 may include pre-stored values for $k_d$, the gain of positional feedback, and $k_v$, the gain of velocity feedback. The traffic reduction engine 68 may also determine the positions and speeds of the vehicles in front of and behind the vehicle 12 based on the sensor data from the client devices 82a-n. In some implementations, the traffic reduction engine 68 estimates the positions and speeds of the vehicle in front of and behind the vehicle 12 based on average speeds and distances between vehicles according to the sensor data from client devices 82a-n on the road segment. In any event, the traffic reduction engine 68 determines the target speed for the vehicle to accelerate or decelerate to within a threshold time period (e.g., 10 seconds, 30 seconds, etc.) based on the vehicle's current speed, the target acceleration, and the threshold time period.

More specifically, in some implementations, the traffic reduction engine 68 may identify the vehicle in front of the vehicle 12 and the vehicle behind the vehicle 12 based on the location data from the client devices 82a-n. For example, the traffic reduction engine 68 may identify the two vehicles closest to the vehicle 12 according to the location data from the client devices 82a-n as the vehicles in front of and behind the vehicle 12. The traffic reduction engine 68 may then determine the positions and speeds of the identified vehicles and the position and speed of the vehicle 12 to determine the target acceleration.

In other implementations, the traffic reduction engine 68 may identify a first set of vehicles in front of the vehicle 12 and a second set of vehicles behind the vehicle 12 based on the location data from the client devices 82*a-n*. For example, the traffic reduction engine 68 may identify vehicles within a threshold distance in front of the vehicle 12 (e.g., 100 ft, 200 ft, 500 ft, 1000 ft, etc.) according to the location data from the client devices 82*a-n* as the vehicles in front of the vehicle 12 and may identify vehicles within a threshold distance behind the vehicle 12 (e.g., 100 ft, 200 ft, 500 ft, 1000 ft, etc.) according to the location data from the client devices 82*a-n* as the vehicles behind the vehicle 12. The traffic reduction engine 68 may then estimate the position and speed of the vehicle in front of the vehicle 12 based on the positions and speeds of the identified vehicles in front of the vehicle 12. For example, the traffic reduction engine 68 may estimate the position and speed of the vehicle in front of the vehicle 12 as the average of the positions and speeds of the identified vehicles in front of the vehicle 12. Furthermore, the traffic reduction engine 68 may estimate the position and speed of the vehicle behind the vehicle 12 based on the positions and speeds of the identified vehicles behind the vehicle 12. For example, the traffic reduction engine 68 may estimate the position and speed of the vehicle behind the vehicle 12 as the average of the positions and speeds of the identified vehicles behind the vehicle 12.

In yet other implementations, the traffic reduction engine 68 may identify the vehicle in front of the vehicle 12 and the vehicle behind the vehicle 12 based on image or video data from infrastructure components 306 on the road segment. More specifically, the traffic reduction engine 68 may determine the license plate number and/or the make and model of the vehicle in front of the vehicle 12 and the license plate number and/or the make and model of the vehicle behind the vehicle 12 by analyzing the image or video data, using optical character recognition (OCR), object recognition, or other computer vision techniques. The infrastructure components 306 may also provide sensor data for the identified vehicles including the positions and speeds of the identified vehicles, and the traffic reduction engine 68 may determine the target acceleration based on the positions and speeds of the identified vehicles. Furthermore, in addition to providing sensor data, the client devices 82*a-n* may provide indications of the vehicles in which they are traveling, such as the make, model, and/or license plate number for the vehicles. In some implementations, users of the client devices 82*a-n* may provide the indications of the vehicles via the navigation application 84 by for example, entering in the make, model, and/or license plate number of their respective vehicles. The traffic reduction engine 68 may then determine the positions and speeds of the vehicles in front of and behind the vehicle 12 based on the sensor data from the client devices 82*a-n* which provide indications of vehicles matching the vehicles identified from the image or video data.

In yet other implementations, the vehicle head unit 14 may receive sensor data from sensors in the vehicle 12 which indicate the distance between the vehicle 12 and the vehicle in front of the vehicle and the distance between the vehicle 12 and the vehicle behind the vehicle. For example, the vehicle 12 may include front-facing and back-facing depth sensors, such as light detection and ranging (LiDAR) sensors, radio detection and ranging (RADAR) sensors, etc. The depth data detected by the front-facing and back-facing depth sensors may be provided to the vehicle head unit 14 which may provide the depth data to the client device 10 via the communication link 16.

The client device 10 may then determine the position of the vehicle in front of the vehicle 12 based on the depth data and the position of the client device 10 from the GPS module. Similarly, the client device 10 may then determine the position of the vehicle behind the vehicle 12 based on the depth data and the position of the client device 10 from the GPS module. The client device 10 may also determine the speed of the vehicle in front of the vehicle 12 based on changes in the depth data. For example, the depth data may be provided to the client device 10 continuously or periodically (e.g., every second, every 5 seconds, every 10 seconds, etc.), and the client device 10 may determine the speed of the vehicle in front of the vehicle 12 based on the change in the depth data over a particular time period and the speed of the vehicle 12 during that time period from the GPS module and/or the accelerometer. The client device 10 may also determine the speed of the vehicle behind the vehicle 12 in a similar. Then the client device 10 may determine the target acceleration based on the positions and speeds of the vehicles in front of and behind the vehicle 12 and the position and speed of the vehicle 12.

In other implementations, the client device 10 may provide the positions and speeds of the vehicles in front of and behind the vehicle 12 and the position and speed of the vehicle 12 to the server device 60, which in turn determines the target acceleration and provides an indication of the target speed to the client device 10. In yet other implementations, the client device 10 provides the depth data to the server device 60 which determines the positions and speeds of the vehicles in front of and behind the vehicle 12. The server device 60 then determines the target acceleration based on the positions and speeds of the vehicles in front of and behind the vehicle 12 and the position and speed of the vehicle 12.

In any event, the traffic reduction engine 68 then provides an indication of the target speed to the speed display 322. In some implementations, the indication of the target speed is a numeric indication or a background color from a set of background colors. In other implementations, the indication of the target speed may be a feedback signal indicative of the difference between the target speed and the current speed. The feedback signal may be provided to a computing device within the vehicle 12 that controls some operation of the vehicle 12 (e.g., a throttle control), such as a computing device in an autonomous vehicle, a semi-autonomous vehicle, or any other vehicle having autonomous operation features. In this manner, the computing device may control the vehicle 12 to adjust the speed and travel at the target speed.

Figure 4A:
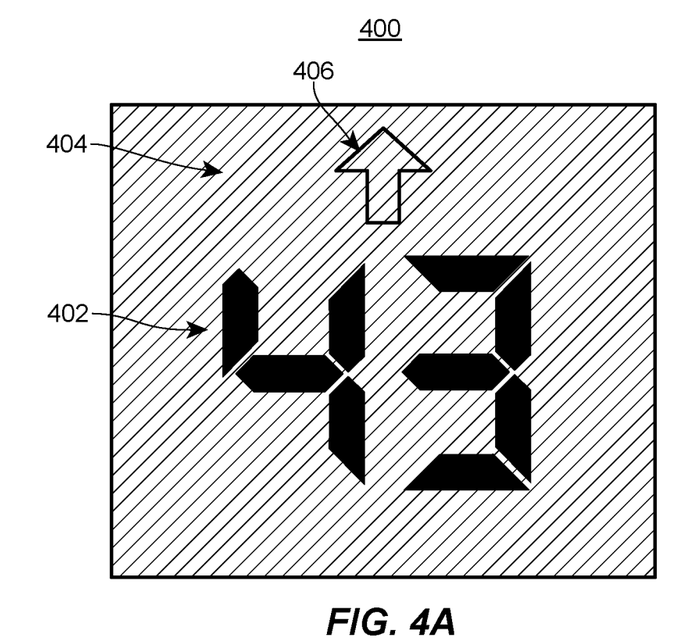
FIGS. 4A-4B are example speed displays indicating target speeds for a vehicle approaching a road segment with traffic to reduce the amount of traffic on the road segment.
Figure 4B:
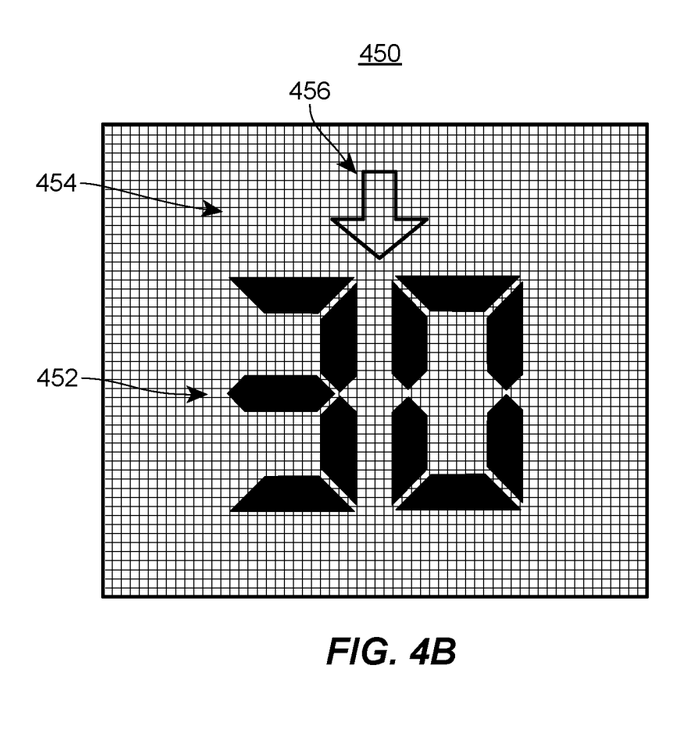

FIGS. 4A and 4B include example speed displays 400, 450 indicating target speeds for a vehicle 12 approaching a road segment with traffic. The speed displays 400 may be presented on the user interface 332 of the client device 10 or on a vehicle head unit 14. Each example speed display 400, 450 includes a numeric indication of the target speed 402, 452 for the vehicle 12, a background color or shading 404, 454 indicating that the vehicle 12 should speed up, slow down, stay at the same speed, rapidly decelerate, etc. The speed displays 400, 450 may be presented with a first background color or shading indicating that the vehicle 12 should speed up, a second background color or shading indicating that the vehicle 12 should slow down, a third background color or shading indicating that the vehicle 12 should remain at the same speed, a fourth background color or shading indicating that the vehicle 12 should rapidly decelerate, etc. Each example speed display 400, 450 also includes another indicator 406, 456 regarding whether the vehicle should speed up, slow down, stay at the same speed, etc., such as a directional arrow.

Figure 5:
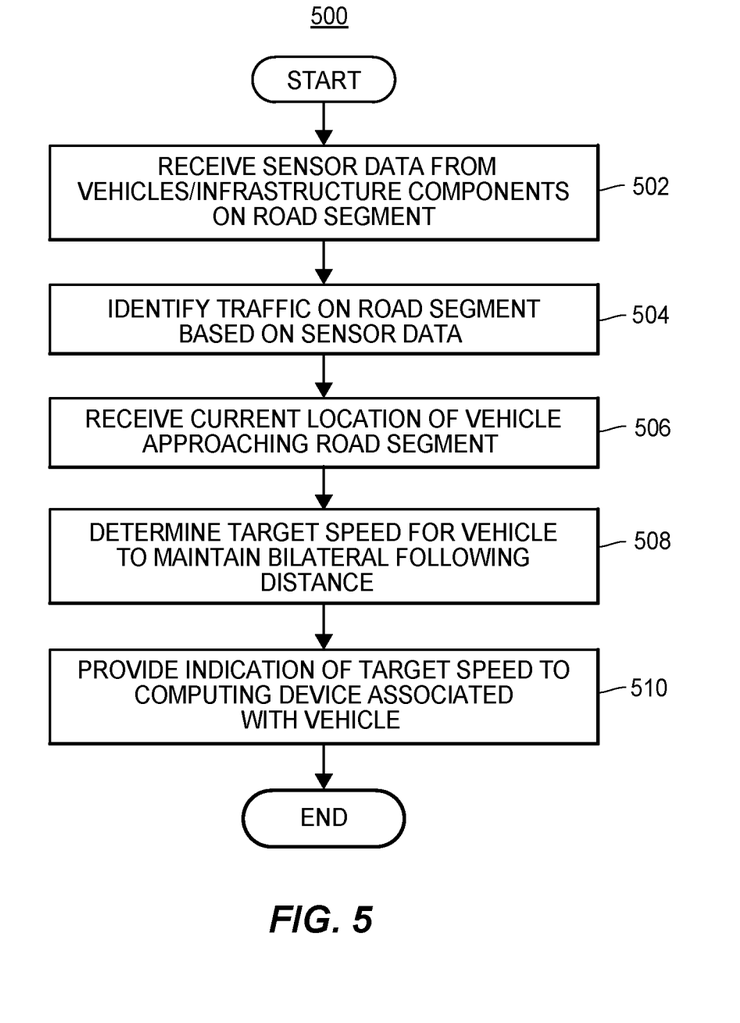
FIG. 5 is a flow diagram of an example method for reducing effects of traffic jams, which may be implemented in a server device.

FIG. 5 illustrates an example method 500 for use in controlling the speed of a vehicle, which can be implemented at a network server (such as the server device 60), for example. The method can be implemented in a set of instructions stored on a computer-readable memory and executable at one or more processors of the server device 60. For example, the method can be implemented by the traffic reduction engine 68.

At block 502, sensor data is received from client devices 82*a-n* operating in vehicles on a road segment. Sensor data may also be received from infrastructure components 306 on the road segment, such as traffic lights. The server device 60 may analyze the sensor data to determine whether there is a threshold amount of traffic on the road segment (block 504). In some implementations, the server device 60 may also analyze the sensor data to determine whether the traffic is caused by an intersection, traffic signal, accident, construction, lane closure, etc., or due to vehicles failing to maintain threshold following distances on the road segment. The threshold amount of traffic may be a traffic density for the road segment, such as 100 vehicles per mile, 200 vehicles per mile, etc. In other implementations, the threshold amount of traffic may be based on a threshold speed for vehicles on the road segment relative to the speed limit for the road segment. In yet other implementations, the threshold amount of traffic may be based on a threshold deceleration for vehicles on the road segment. In other implementations, the server device 60 may receive traffic data from a traffic server indicating the amount of traffic on the road segment. The traffic server may provide a traffic density for the road segment, a categorical description of the amount of traffic, such as light, medium, or heavy, or an indication of an expected amount of additional time for traversing the road segment due to the traffic. Accordingly, in this example, the threshold amount of traffic may be a threshold traffic density (e.g., 100 vehicles per mile), a threshold traffic category (e.g., medium or above), or a threshold amount of additional time for traversing the road segment due to the traffic (e.g., 5 minutes).

To determine whether there is a threshold amount of traffic on the road segment, the server device 60 may compare average speed and/or acceleration/deceleration values for vehicles on the road segment to a threshold speed or deceleration to determine whether the road segment has a threshold amount of traffic. The threshold speed may be based on the speed limit for the road segment, such that the threshold speed for a road segment having a speed limit of 55 mph, for example, is higher than the threshold speed for a road segment having a speed limit of 35 mph. In some implementations, the sensor data from the infrastructure components 306 may include image or video data from a camera on the road segment. The server device 60 may analyze the image or video data to determine that there are no accidents, lane closures, traffic signals, construction, etc., on the road segment.

When the server device 60 determines there is more than the threshold amount of traffic on the road segment at a particular time, the server device 60 may flag the road segment and store indications of road segments having more than the threshold amount of traffic at the particular time. Once the server device 60 determines that the road segment does not have the threshold amount of traffic, the server device 60 may remove the road segment from the list.

Then in response to receiving a current location of a client device 10 in or associated with a vehicle 12 (block 506), the server device 60 may compare the current location to the indications of road segments having more than the threshold amount of traffic to determine whether the vehicle 12 is on or approaching a road segment having more than the threshold amount of traffic. The server device 60 may determine that the vehicle 12 is approaching the road segment when the vehicle 12 is within a threshold distance of the road segment (e.g., 500 ft, half of a mile, one mile, etc.), and/or when the vehicle 12 is travelling toward the road segment according to the direction of travel of the vehicle.

When the server device 60 determines that the vehicle 12 is approaching a road segment having more than the threshold amount of traffic, a target speed for the vehicle 12 is determined to maintain a bilateral following distance between the vehicle 12 and the vehicles in front of and behind the vehicle 12 to reduce the traffic (block 508). In some implementations, the server device 60 determines the target speed for a particular time period (e.g., 10 seconds, 30 seconds, etc.) by determining a target acceleration for the particular time period and a current speed of the vehicle 12. The server device 60 then identifies the target speed as the sum of the current speed and the product of the target acceleration and the particular time period. As described above, the server device 60 determines the target acceleration based on the position and speed of the vehicle 12 according to sensor data from the client device 10, and the positions and speeds of a vehicle or vehicles in front of and behind the vehicle 12 according to sensor data from the other client devices 82*a-n*. The positions and speeds of vehicles directly in front of the vehicle 12 may be estimated based on a combination of the positions and speeds of several vehicles within a threshold distance in front of the vehicle 12. Furthermore, the positions and speeds of vehicles directly behind the vehicle 12 may be estimated based on a combination of the positions and speeds of several vehicles within a threshold distance behind the vehicle 12.

Then at block 510, the server device 60 provides an indication of the target speed for example, to the client device 10 or to a vehicle head unit 14. In some implementations, the indication of the target speed is a numeric indication or a background color from a set of background colors. In other implementations, the indication of the target speed may be a feedback signal indicative of the difference between the target speed and the current speed. The feedback signal may be provided to a computing device within the vehicle 12 that controls some operation of the vehicle 12 (e.g., a throttle control), such as a computing device in an autonomous vehicle, a semi-autonomous vehicle, or any other vehicle having autonomous operation features to control the vehicle 12 to adjust the speed and travel at the target speed.

In some implementations, the client device 10 continuously or periodically provides sensor data to the server device 60 indicating the current location and/or speed of the vehicle 12. The server device 60 may then generate updated target speeds, periodically (e.g., every 30 seconds, every minute, every 2 minutes, every 5 minutes, etc.) or continuously, based on the most recent location and speed of the vehicle 12 and most recent locations and speeds of vehicles in front of and behind the vehicle 12 which are on or approaching the road segment. The server device 60 then provides indications of the updated target speeds for example, to the client device 10 or to the vehicle head unit 14. In this manner, a user may adjust the speed of the vehicle 12 accordingly.

Figure 6:
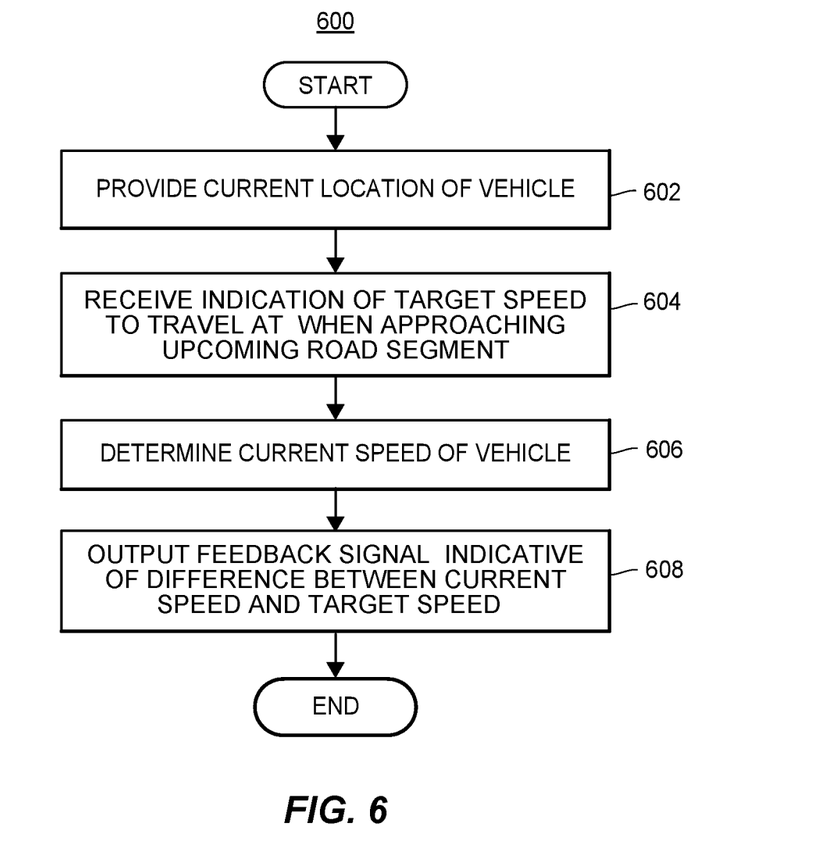
FIG. 6 is a flow diagram of an example method for presenting a speed display to reduce effects of traffic jams, which may be implemented in a client device.

FIG. 6 illustrates an example method 600 for use in controlling the speed of a vehicle, which can be implemented at a client device (such as the client device 10), for example. The method can be implemented in a set of instructions stored on a computer-readable memory and executable at one or more processors of the client device 10. For example, the method can be implemented by the speed display 322.

At block 602, the client device 10, operating in a vehicle 12, provides an indication of its current location to the server device 60. The client device 10 may provide indications of its current location continuously to the server device 60, periodically, at predetermined time intervals, or in any other suitable manner. Then at block 604, the client device 10 receives an indication from the server device 60 of a target speed to travel at as the vehicle 12 approaches a road segment with more a threshold amount of traffic. At block 606, the client device 10 determines the current speed of the vehicle 12, for example based on sensor data from the GPS module and/or the accelerometer.

The client device 10 then generates a feedback signal indicative of the difference between the current speed and the target speed. The feedback signal may be an indication of the target speed displayed on the user interface 332, such as the speed displays 400, 450 shown in FIGS. 4A and 4B. More specifically, the user interface 332 may present a numeric indication of the target speed for the vehicle 12, a background color or shading indicating that the vehicle 12 should speed up, slow down, stay at the same speed, rapidly decelerate, etc., based on the current speed of the vehicle 12, a directional arrow indicating that the vehicle 12 should speed up, slow down, stay at the same speed, rapidly decelerate, etc., based on the current speed of the vehicle 12, or any other suitable indicator.

Additionally, in some implementations, the feedback signal may be an indication of the target speed which is provided to a throttle control of the vehicle 12. For example, the client device 10 may provide the indication of the target speed to a computing device within the vehicle 12 that controls some operation of the vehicle 12, such as the vehicle head unit 14. The computing device may then control the vehicle 12 to travel at the target speed.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for controlling the speed of the vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for use in controlling the speed of a vehicle, the method comprising:
   identifying, at one or more processors, a road segment within a geographic area having more than a threshold amount of traffic, wherein the traffic is not caused by an accident, a lane closure, construction, or a traffic signal;
   in response to identifying the road segment wherein the traffic is not caused by the accident, the lane closure, construction, or the traffic signal, determining, by the one or more processors, a threshold following distance for the road segment based on a traffic density of the road segment, wherein the threshold following distance decreases as the traffic density increases;
   determining, by the one or more processors, a target speed based on the threshold following distance for a vehicle approaching the road segment to travel at to reduce an amount of traffic at the road segment; and controlling the vehicle speed by providing, by the one or more processors, the target speed to a computing device associated with the vehicle approaching the road segment.

2. The method of claim 1, wherein the traffic is caused by vehicles failing to maintain threshold following distances on the road segment, and wherein identifying a road segment within a geographic area having more than the threshold amount of traffic includes:
receiving, at one or more processors, sensor data for vehicles travelling on the road segment, wherein the sensor data indicates that the vehicles are travelling at speeds below a threshold speed or decelerating by more than a threshold deceleration; and
identifying, by the one or more processors, traffic at the road segment based on the sensor data.

3. The method of claim 1, wherein identifying a road segment within a geographic area having more than the threshold amount of traffic includes:
receiving, at one or more processors from infrastructure components located at the road segment, sensor data for vehicles travelling on the road segment, wherein the sensor data indicates that the vehicles are travelling at speeds below a threshold speed or decelerating by more than a threshold deceleration and wherein the sensor data includes image data depicting the vehicles on the road segment; and
identifying, by the one or more processors, the traffic at the road segment based on the sensor data.

4. The method of claim 1, wherein controlling the vehicle speed by providing the target speed includes:
providing, by the one or more processors, the target speed to a computing device operating in a vehicle having autonomous operation features for adjusting the vehicle speed.

5. The method of claim 1, wherein identifying a road segment within a geographic area having more than the threshold amount of traffic includes:
receiving, at the one or more processors, a signal from a vehicle located within the road segment, the signal indicating that the traffic is not caused by an accident, a lane closure, construction, or a traffic signal.

6. A server device for use in controlling the speed of a vehicle, the server device comprising:
one or more processors; and
a non-transitory computer-readable memory coupled to the one or more processors and storing instructions thereon that, when executed by the one or more processors, cause the server device to:
identify a road segment within a geographic area having more than a threshold amount of traffic, wherein the traffic is not caused by an accident, a lane closure, construction, or a traffic signal;
in response to identifying the road segment wherein the traffic is not caused by the accident, the lane closure, construction, or the traffic signal, determine a threshold following distance for the road segment based on a traffic density of the road segment, wherein the threshold following distance decreases as the traffic density increases;
determine a target speed based on the threshold following distance for a vehicle approaching the road segment to travel at to reduce an amount of traffic at the road segment; and
control the vehicle speed by providing the target speed to a computing device associated with the vehicle approaching the road segment.

7. The server device of claim 6, wherein to identify a road segment within a geographic area having more than the threshold amount of traffic, the instructions cause the server device to:
receive sensor data for vehicles travelling on the road segment, wherein the sensor data indicates that the vehicles are travelling at speeds below a threshold speed or decelerating by more than a threshold deceleration; and
identify traffic at the road segment based on the sensor data.

8. The server device of claim 6, wherein to identify a road segment within a geographic area having more than the threshold amount of traffic, the instructions cause the server device to:
receive, from infrastructure components located at the road segment, sensor data for vehicles travelling on the road segment, wherein the sensor data indicates that the vehicles are travelling at speeds below a threshold speed or decelerating by more than a threshold deceleration and wherein the sensor data includes image data depicting the vehicles on the road segment; and
identify the traffic at the road segment based on the sensor data.

9. The server device of claim 6, wherein to provide the target speed, the instructions cause the server device to provide an indication of a background color to display on a client device of a user, wherein the background color is selected from a plurality of background colors each indicating a different change in speed at which to travel.

10. The server device of claim 6, wherein to control the vehicle speed by providing the target speed, the instructions cause the server device to:
provide the target speed to a computing device operating in a vehicle having autonomous operation features for adjusting a speed of the vehicle.

11. A method for use in controlling the speed of a vehicle, the method comprising:
providing, by one or more processors in a vehicle to a server device, an indication of a location of the vehicle;
receiving, at the one or more processors from the server device, an indication of a target speed based on a threshold following distance for the vehicle to travel at when the vehicle is approaching a road segment having more than a threshold amount of traffic, wherein the traffic is not caused by an accident, a lane closure, construction, or a traffic signal, wherein the threshold following distance is based on a traffic density of the road segment, and wherein the threshold following distance decreases as the traffic density increases;
determining, by the one or more processors, a current speed of the vehicle; and
controlling the vehicle speed by outputting, by the one or more processors, a feedback signal of the target speed for the vehicle to travel at the target speed.

12. The method of claim 11, further comprising providing the feedback signal to a throttle control of the vehicle.

13. The method of claim 11, wherein outputting the feedback signal comprises displaying visual feedback on a user interface.

14. The method of claim 13, wherein displaying visual feedback comprises displaying an indication of the target speed on the user interface.

15. The method of claim 14, wherein displaying an indication of the target speed on the user interface includes:
presenting, by the one or more processors, a numeric indication of the target speed.

16. The method of claim 14, wherein displaying an indication of the target speed on the user interface includes:
  presenting, by the one or more processors, a background color from a set of background colors each indicating a different change in speed.

17. The method of claim 11, wherein providing an indication of a location of a vehicle includes providing, by the one or more processors, positioning data indicating a speed and direction of travel of the vehicle indicating the vehicle is within a threshold distance of the road segment and is travelling toward the road segment.

18. The method of claim 1, wherein the threshold following distance is a bilateral following distance between the vehicle and a second vehicle in front of the vehicle, and between the vehicle and a third vehicle behind the vehicle.

* * * * *